United States Patent [19]

Okano et al.

[11] Patent Number: 5,262,949
[45] Date of Patent: Nov. 16, 1993

[54] CONTROL SYSTEM FOR VEHICLE SAFETY DEVICE

[75] Inventors: Masami Okano; Kunihiro Takeuchi; Hideyuki Kaneko; Hideki Ishizuka, all of Saitama, Japan

[73] Assignee: Zexel Corporation, Tokyo, Japan

[21] Appl. No.: 28,608

[22] Filed: Mar. 8, 1993

Related U.S. Application Data

[63] Continuation of Ser. No. 648,055, Jan. 30, 1991, abandoned.

[30] Foreign Application Priority Data

Feb. 20, 1990 [JP] Japan ................................. 2-37338

[51] Int. Cl.$^5$ .................. B60R 21/02; B60R 21/32
[52] U.S. Cl. .................. 364/424.05; 180/282; 280/735
[58] Field of Search ............... 364/424.05; 280/728, 280/734, 735, 801; 340/436, 438; 180/271, 282

[56] References Cited

U.S. PATENT DOCUMENTS

| | | | |
|---|---|---|---|
| 4,497,025 | 1/1985 | Hannoyer | 364/424.05 |
| 4,638,179 | 1/1987 | Mattes et al. | 280/735 X |
| 4,836,024 | 6/1989 | Woehrl et al. | 280/735 X |
| 4,853,623 | 8/1989 | Sterler et al. | 340/436 X |
| 4,985,835 | 1/1991 | Sterler et al. | 364/424.05 |
| 5,003,190 | 3/1991 | Seiler | 280/735 X |
| 5,067,745 | 11/1991 | Yoshikawa | 280/735 |
| 5,068,640 | 11/1991 | Burger et al. | 340/438 |
| 5,068,793 | 11/1991 | Condne et al. | 364/424.05 |
| 5,081,587 | 1/1992 | Okano | 364/424.05 |
| 5,083,276 | 1/1992 | Okano et al. | 364/424.05 |

FOREIGN PATENT DOCUMENTS

49-55031 5/1974 Japan .
2-5371 1/1990 Japan .

*Primary Examiner*—Thomas G. Black
*Assistant Examiner*—Collin W. Park

[57] ABSTRACT

A control system for a vehicle safety device includes an acceleration detecting device for detecting the deceleration of the vehicle, an integrating device for integrating the deceleration from the acceleration detecting device, a collision judgment device for comparing the integral value, obtained by the integrating device, with a trigger threshold level so as to judge whether or not a collision has occurred, and for outputting an activation instruction signal when the collision judgment device judges that the collision has occurred, and a drive circuit responsive to the activation instruction signal from the collision judgment device so as to activate the vehicle safety device. The control system further includes a deceleration compensation device for adjusting the trigger threshold level in accordance with the deceleration in such a manner that the trigger threshold level becomes low when the deceleration is large and that the trigger threshold level becomes high when the deceleration is small.

12 Claims, 7 Drawing Sheets

(MAP A)

(MAP B)

(MAP C)

Fig.9 (MAP X)

Fig.10 (MAP Y)

Fig.11 (MAP Z)

CONTROL SYSTEM FOR VEHICLE SAFETY DEVICE

This application is a continuation of U.S. application Ser. No. 07/648,055 filed Jan. 30, 1991, now abandoned.

BACKGROUND OF THE INVENTION

1. Field of the Invention

This invention relates to a control system for a vehicle safety device.

2. Discussion of the Related Art

As disclosed in Japanese Laid-Open (Kokai) Patent Application No. 55031/74 and Japanese Laid-Open Utility Model Application No. 5371/90, a system for controlling a vehicle safety device, such as an air bag, is already known. This control system comprises acceleration detecting means for detecting a negative acceleration (i.e., deceleration) of a vehicle, integrating means for integrating the deceleration outputted from the acceleration detecting means, collision judgment means for comparing the integral value from the integrating means with a threshold level so as to judge whether or not a collision has occurred, and for outputting an activation instruction signal when the collision judgment means judges that the collision has occurred, and a drive circuit responsive to the activation instruction signal from the collision judgment means so as to supply electric current to a squib of the air bag to thereby expand the air bag.

In the above control system, the time period from the time of start of the deceleration caused by the collision to the time of completion of the expanding of the air bag is determined by the sum of the following first and second time periods. The first time period begins from the time of start of the deceleration, and ends at the time when the activation instruction signal for supplying the current to the squib is outputted when the integral value of the deceleration reaches the threshold level. The second time period begins from the time of supply of the current to the squib in response to the activation instruction signal, and ends at the time of completion of the expanding of the squib.

When the vehicle heavily collides (in other words, when an abrupt deceleration occurs for a short time period), the time period from the time of start of the deceleration to the time when the passengers are forced forwardly due to an inertia force is short. Therefore, in this case, it is necessary to expand the air bag early. In the above control system, when the deceleration is large, the integral value of the deceleration reaches the threshold level early, and therefore the above first time period can be shortened. However, since the above second time period is constant, there remains a possibility that the sum of the first and second time periods can not be shortened sufficiently.

On the other hand, when the collision is rather mild (in other words, when the deceleration occurs for a relatively long time period), there is no risk that the passengers impinge on a steering wheel, etc., because the inertia force exerted on the passengers is small. Therefore, in this case, it is necessary to prevent the air bag from being expanded. However, even when the deceleration is small, the integral value increases with time, and therefore there is a possibility that the integral value finally reaches to the threshold level, thereby causing an inadvertent activation of the air bag.

This difficulty is attributable to the fact that the threshold level for judging the collision is constant. One of the inventors of the present invention filed a U.S. patent application Ser. No. 473,561 on Jan. 19, 1990 which is directed to the technique of adjusting a threshold level for collision judgment from an aspect different from that of the present invention. Japanese Published Application No. 503531/88 (corresponding to International Application PCT/DE87/00078 including the United States as one of the designated countries), and U.S. Pat. Nos. 4,638,179, 4,836,024 and 4,497,025 are listed as the relevant prior art.

SUMMARY OF THE INVENTION

It is an object of this invention to provide a control system for a vehicle safety device which can overcome the above-mentioned problem by substantially adjusting the trigger threshold level in accordance with the deceleration.

According to the present invention, there is provided a control system for a vehicle safety device comprising:

(a) acceleration detecting means for detecting deceleration of a vehicle;

(b) integrating means for integrating the deceleration from the acceleration detecting means;

(c) collision judgment means for comparing an integral value, obtained by the integrating means, with a threshold level so as to judge whether or not a collision has occurred, and for outputting an activation instruction signal when the collision judgment means judges that the collision has occurred;

(d) a drive circuit responsive to the activation instruction signal from the collision judgment means so as to activate the vehicle safety device; and (e) deceleration compensation means for adjusting the trigger threshold level in accordance with the deceleration in such a manner that the trigger threshold level becomes low when the deceleration is large and that the threshold level becomes high when the deceleration is small.

DESCRIPTION OF THE PREFERRED EMBODIMENTS OF THE INVENTION

Figure 1:
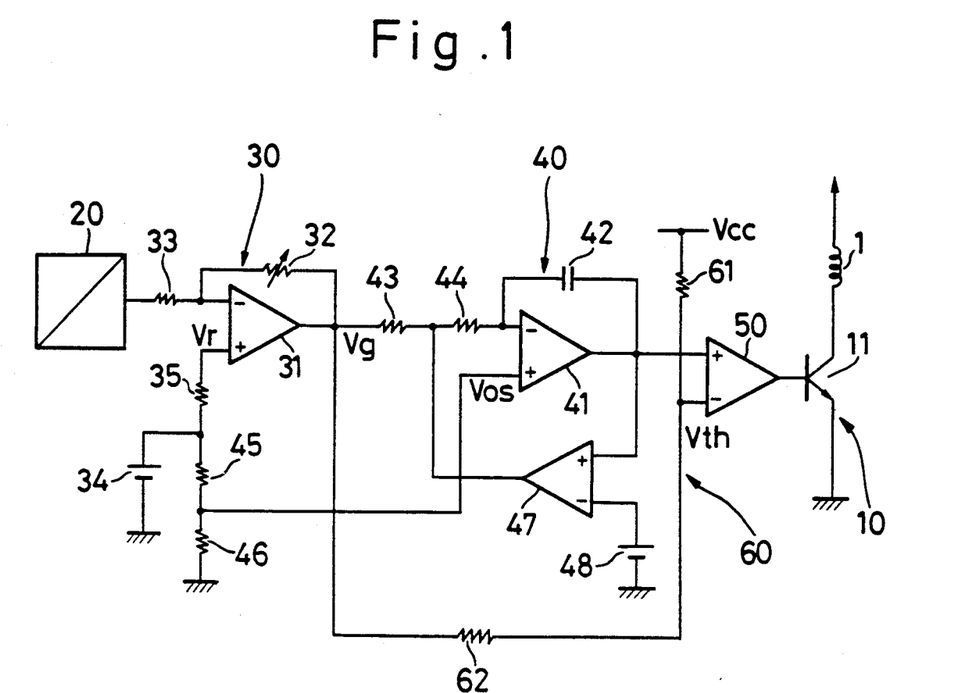
FIG. 1 is a schematic circuit diagram of a control system of the analog type provided in accordance with the present invention.
Figure 2:
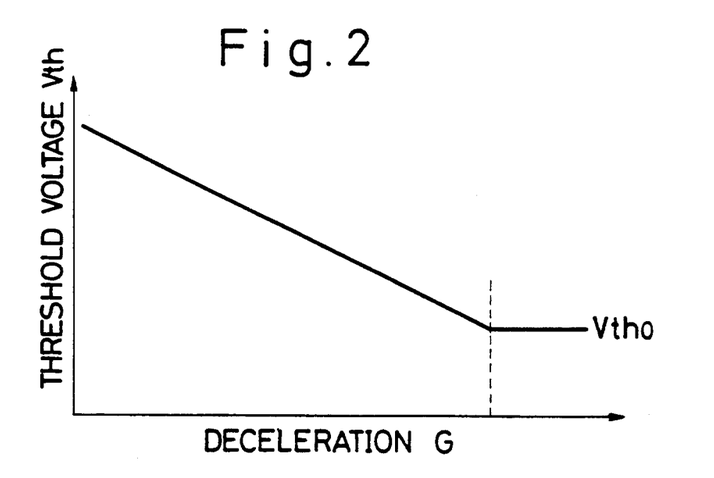
FIG. 2 is a diagrammatical illustration showing deceleration-threshold voltage characteristics obtained with the circuit of FIG. 1.

One preferred embodiment of the invention will now be described with reference to FIGS. 1 and 2. FIG. 1 schematically shows a control system for controlling a squib 1 of an air bag (vehicle safety device). The squib 1 is incorporated in a drive circuit 10. The drive circuit 10 includes a transistor 11 connected between the squib 1 and the ground. Provided between the squib 1 and a battery are an energy reservoir (not shown) in the form of a capacitor of a large capacity, and a booster circuit (not shown) for increasing the voltage of the energy reservoir to a level higher than the battery voltage. The energy reservoir and the booster circuit are arranged in this order from the squib 1 toward the battery.

The control system comprises an acceleration sensing circuit 20 including an acceleration sensor. The acceleration sensing circuit 20 outputs a voltage signal corresponding to the acceleration of a vehicle. More specifically, with respect to a reference voltage of 2.5 V, the output voltage of the acceleration sensing circuit 20 is lower than 2.5 V when the vehicle is accelerated, and is higher than 2.5 V when the vehicle is decelerated.

The voltage signal from the acceleration sensing circuit 20 is invertingly amplified by an inverting amplifier circuit 30. More specifically, the inverting amplifier circuit 30 comprises an operational amplifier 31, a variable resistor 32 connected to the operational amplifier 31 in a negative feedback manner, and an input resistor 33. The reference voltage Vr of 2.5 V is supplied from an auxiliary constant voltage source 34 to a non-inverting input terminal of the operational amplifier 31 via a resistor 35. Therefore, the inverting amplifier circuit 30 outputs a voltage of above or below 2.5 V obtained by invertingly amplifying the voltage signal from the acceleration sensing circuit 20. More specifically, the output voltage of the inverting amplifier circuit 30 is higher than 2.5 V at the time of the vehicle acceleration, and is lower than 2.5 V at the time of the vehicle deceleration. By adjusting the variable resistor 32, ideal acceleration-output voltage characteristics similar to those achieved by the use of a reference acceleration sensor can be obtained. The acceleration sensing circuit 20 and the inverting amplifier circuit 30 jointly constitute acceleration detecting means.

The output voltage of the inverting amplifier circuit 30 is integrated by an integrating circuit (integrating means) 40. The integrating circuit 40 comprises an operational amplifier 41 arranged in a negative feedback manner via a capacitor 42, and resistors 43 and 44 connected to an inverting input terminal of the operational amplifier 41. An offset voltage Vos is supplied to a non-inverting input terminal of the operational amplifier 41. The offset voltage Vos is obtained by dividing the voltage (2.5 V) of the auxiliary constant voltage source 34 by resistors 45 and 46, and is, for example, 2.0 V.

The integrating circuit 40, when receiving from the inverting amplifier circuit 30 the voltage lower than the offset voltage Vos (2.0 V), integrates this voltage, so that the output voltage of the integrating circuit increases. In contrast, when the integrating circuit 40 receives from the inverting amplifier circuit 30 the voltage higher than the offset voltage Vos, its output voltage decreases. In other words, when the vehicle deceleration is greater than the deceleration corresponding to the difference (0.5 V) between the reference voltage Vr and the offset voltage Vos, the integrating calculation is effected by the integrating circuit 40, and its output voltage increases. Not only when the vehicle is in an accelerating condition but also when the vehicle deceleration is less than the deceleration corresponding to the above value of 0.5 V, the output voltage of the integrating circuit 40 decreases.

The integrating circuit 40 further comprises a comparator 47. The output voltage of the operational amplifier 41 is fed to a non-inverting input terminal of the comparator 47. A very low voltage of 100 mV is supplied from a very low-voltage source 48 to an inverting input terminal of the comparator 47. When the voltage fed from the inverting amplifier circuit 30 to the operational amplifier 41 is higher than the offset voltage Vos, the output of the operational amplifier 41 decreases toward zero, and is maintained at 100 mV. More specifically, when the output of the operational amplifier 41 goes even slightly below 100 mV, the output of the comparator 47 is switched to a low level, so that the output of the operational amplifier 41 goes high toward 100 mV. When the output of the operational amplifier 41 goes even slightly above 100 mV, the comparator 47 is switched to a high impedance, so that the output of the operational amplifier 41 goes low toward 100 mV. With this arrangement, the output voltage of the operational amplifier 41 is prevented from becoming saturated at zero volts, and also the output of the integrating circuit 40 can always be maintained at a linear region.

The output of the integrating circuit 40 is fed to a non-inverting input terminal of a comparator (collision judgment means) 50. A threshold voltage is supplied from a threshold voltage generating circuit (deceleration compensation means) 60 to an inverting input terminal of the comparator 50. The threshold voltage generating circuit 60 comprises a serial circuit of resistors 61 and 62, and one terminal thereof is connected to a constant voltage source Vcc whereas the other terminal is connected to the output stage of the inverting amplifier circuit 30. The voltage at the junction point between the resistors 61 and 62 is supplied as the threshold voltage Vth to the comparator 50. The threshold voltage Vth can be expressed by the following formula:

$$Vth = (Vcc - Vg) \cdot R_{62}/(R_{61} + R_{62}) + Vg \qquad (1)$$

As is clear from this formula, the threshold voltage Vth linearly varies in accordance with the voltage Vg representative of the deceleration. Namely, as indicated by a characteristics line in FIG. 2, the threshold voltage Vth decreases with the increase of the deceleration G.

The inverting amplifier circuit 30 is connected to the single voltage source, and therefore even when the actual deceleration G is very large, the output voltage Vg of the inverting amplifier circuit 30 will not become negative, and its lower limit is substantially zero volts. Therefore, the lower limit $Vth_0$ of the threshold voltage Vth is determined by substituting "0" for Vg in the above formula (1), and is expressed by the following formula (2):

$$Vth_0 = Vcc \cdot R_{62}/(R_{62} + R_{62}) \qquad (2)$$

In the above construction, the comparator 50 compares the output of the integrating circuit 40, representative of the integral value of the deceleration, with the threshold level Vth, and when the former exceeds the latter, the output of the comparator 50 goes to the high level so as to turn on the transistor 11. As a result, the squib 1 is supplied with the current from the energy reservoir, and is ignited to effect the expansion of the air bag.

As described above, the threshold voltage Vth decreases with the increase of the deceleration, and therefore when the collision is heavy to cause a large deceleration, the integral output (the integral value of the deceleration) early reaches the threshold voltage Vth, thereby effecting the ignition of the squib 1. Therefore, the expansion of the air bag is carried out earlier to thereby ensure the safety of the passengers of the vehicle.

In contrast with the above case, when the collision is so mild as not to require the expansion of the air bag (and hence the vehicle deceleration is small), the threshold voltage Vth becomes high, and therefore even when the integral output increases with time, the integral output does not reach the threshold voltage Vth. This prevents an inadvertent activation of the air bag. When the collision is not so heavy, but is of such a degree as to require the expansion of the air bag so as to ensure the safety of the passengers, it takes a relatively long time period for the integral value of the deceleration to reach the threshold voltage Vth. In this case, however, the time period during which the passengers are forced to move forwardly is relatively long, and therefore there is no problem with the assurance of the safety of the passengers.

The threshold voltage Vth is maintained at the constant lower limit $Vth_0$ even when the deceleration becomes large, and therefore even when a very large deceleration is produced by an instantaneous impact such as a hammer blow applied at the time of repair of the vehicle, the integral voltage does not reach the lower limit $Vth_0$ of the threshold voltage. This also prevents an inadvertent activation of the air bag.

Figure 3:
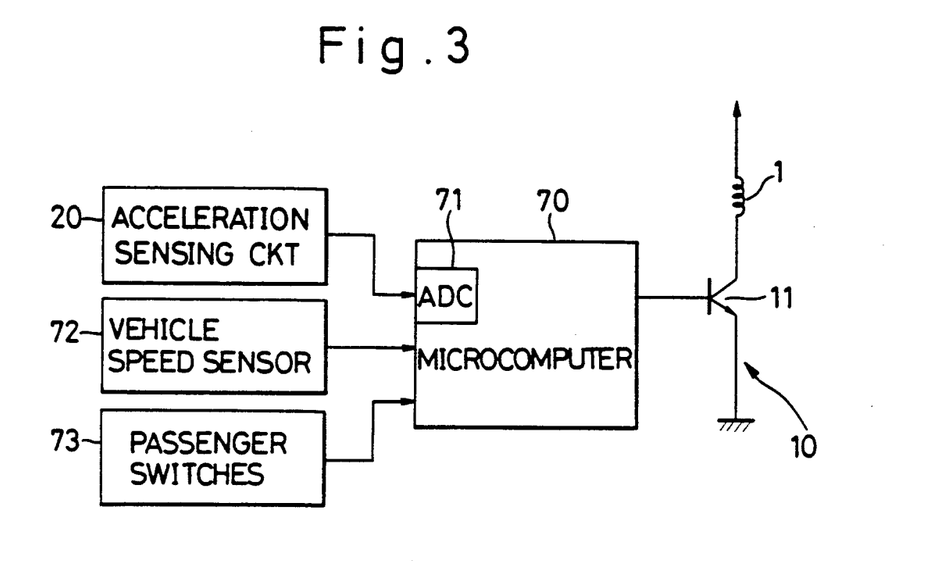
FIG. 3 is a block diagram of a modified control system using a microcomputer.

A control system of FIG. 3 includes a microcomputer 70. Those parts of FIG. 3 corresponding respectively to those of FIG. 1 are designated by identical reference numerals, respectively, and detailed explanation thereof will be omitted. A voltage signal representative of the acceleration is fed from an acceleration sensing circuit 20 to an analog-to-digital converter 71 contained in the microcomputer 70. Also, signals are fed respectively from a vehicle speed sensor (vehicle speed detecting means) 72 and passenger switches 73 to the microcomputer 70. The vehicle speed sensor 72 outputs pulses in response to the rotation of a wheel axle of the vehicle. The number of the pulses outputted from the vehicle speed sensor 72 for a predetermined time period, or the reciprocal of the time interval between the pulses represents the speed of the vehicle. The passenger switches 73 are provided on all the seats of the vehicle, respectively, and when the passenger is seated on the seat, the corresponding passenger switch 73 is turned on. Therefore, the number of the turned-on passenger switches 73 represents the number of the passengers. In FIG. 3, the plurality of passenger switches 73 are indicated by one block.

Figure 4:
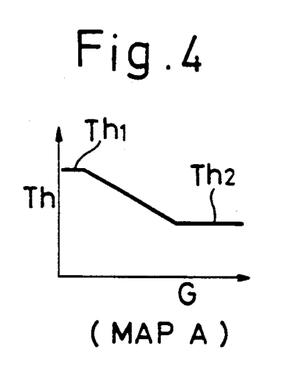
FIGS. 4 to 6 are diagrammatical illustrations respectively showing maps of different deceleration-threshold level characteristics used in the microcomputer.
Figure 5:
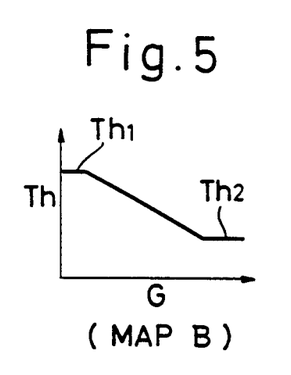
Figure 6:
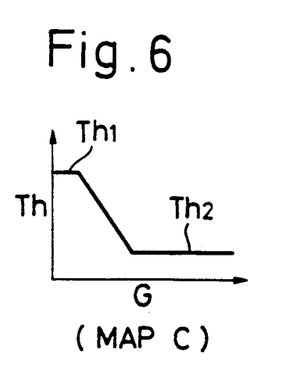

Maps A, B and C shown respectively in FIGS. 4 to 6 are stored in the microcomputer 70. Each of the maps A, B and C has a characteristics line similar to the threshold voltage-deceleration characteristics line of FIG. 2. Namely, the abscissa axis represents a deceleration G, and the ordinate axis represents a trigger threshold level Th. The threshold level Th decreases with the increase of the deceleration G. In the region of each of the maps A, B and C where the deceleration G is small, the trigger threshold level Th is at its upper limit Th1 and is constant. In the region where the deceleration G is moderate, the relation between the trigger threshold level Th and the deceleration is substantially linear. In the region where the deceleration G is large, the trigger threshold level Th is at its lower limit Th2 and is constant. The maps A, B and C differ from one another on the following points. The lower limit Th2 of the trigger threshold level Th is the highest in the map A, and is the lowest in the map C, and is intermediate in the map B. The inclination of the characteristics line in the intermediate region of the deceleration G is gentle in the maps A and B, and is abrupt in the map C. Therefore, when the deceleration G is equal, the trigger threshold level Th is higher in the order of the maps A, B and C.

The microcomputer 70 selects one of the maps A, B and C in accordance with the vehicle speed, and determines the trigger threshold level Th based on the selected map and the deceleration G. This will now be described in detail.

The microcomputer 70 executes a timer interrupt routine (FIG. 7) at a predetermined cycle. First, the deceleration G is obtained by multiplying deceleration data from the acceleration sensing circuit 20 by a predetermined gain (Step 100). the acceleration-output voltage characteristics of the acceleration sensing circuit 20 deviates from an ideal acceleration-output voltage characteristics of a reference acceleration sensing circuit, and therefore this deviation is compensated for by the above gain.

Figure 7:
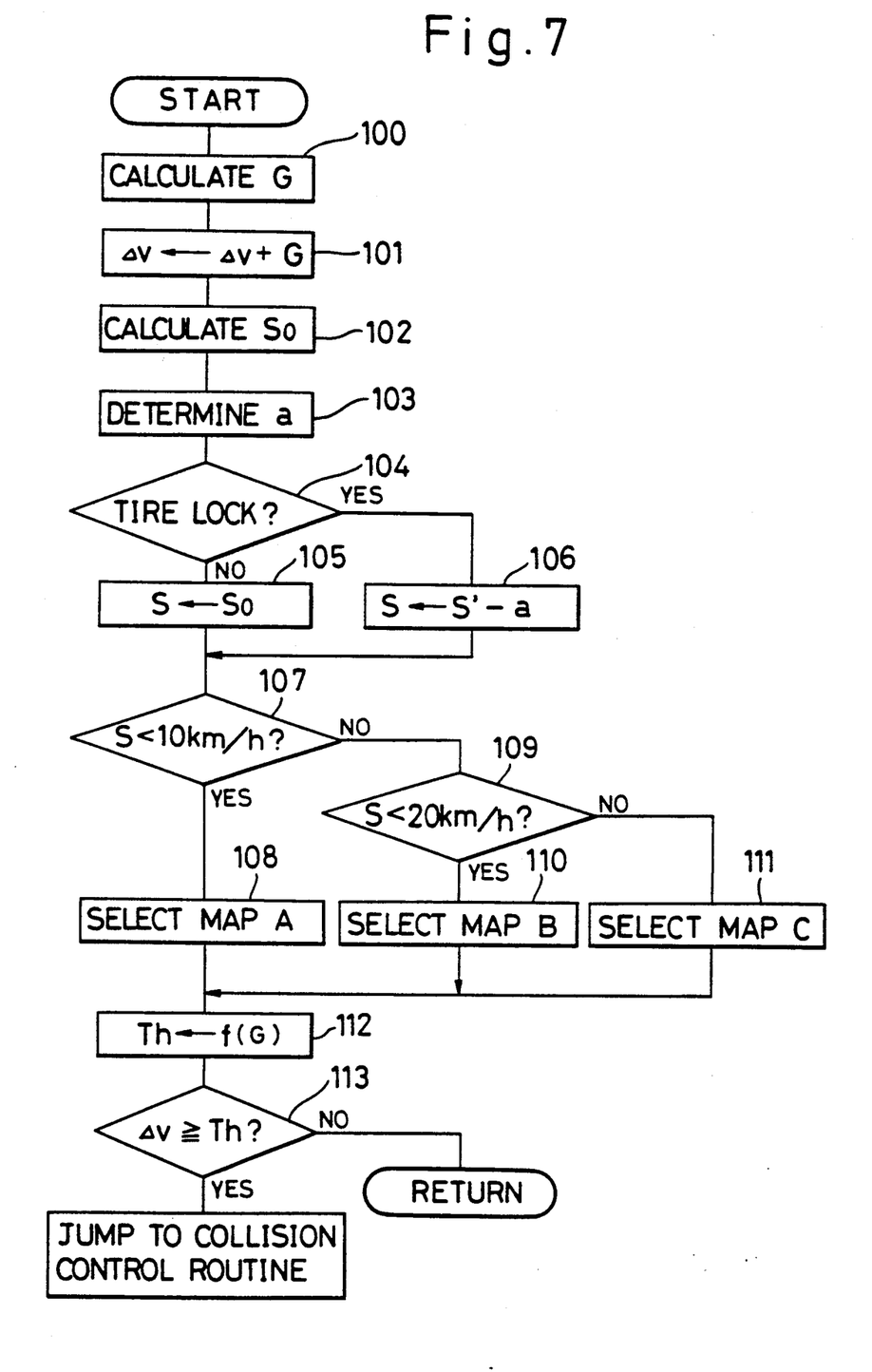
FIG. 7 is a flow chart of a timer interrupt routine executed by the microcomputer of FIG. 3.

Then, the deceleration G is integrated (Step 101). More specifically, when the deceleration G is above a predetermined level, the value of the deceleration G calculated at this time is added to an integral value $\Delta v$ stored in RAM. When the deceleration is below a predetermined level, or the acceleration is sensed, a predetermined value is subtracted from the above integral value $\Delta v$. Then, the vehicle speed $S_0$ is calculated in accordance with the signal from the vehicle speed sensor 72 (Step 102). Then, the constant a corresponding to the number of the passengers is determined in accordance with the signals from the passenger switches 73 (Step 103). The constant a decreases with the increase of the number of the passengers, as later described.

Then, it is judged whether or not a tire-locked condition resulting from hard braking is encountered (Step 104). Specifically, when the difference between the speed S', determined in Step 105 (later described) in the preceding routine, and the speed $S_0$ determined at this time exceeds a predetermined value, it is judged that the tire has been locked. Once it is judged that the tire lock has occurred, it is judged in Step 104 of each of the routines to be subsequently executed within a predetermined time period that the tire is in a locked condition.

At the time of the tire lock, the vehicle speed sensed by the vehicle speed sensor 72 abruptly decreases to zero; however, the vehicle slips, and is gradually decelerated, and actually a considerable vehicle speed is maintained.

If it is judged in Step 104 that the tire lock has not occurred, the vehicle speed $S_0$ calculated in Step 102 is decided to be the actual vehicle speed S (Step 105). If it is judged that the tire lock has occurred, the constant a determined in Step 103 is subtracted from the precedingly-determined speed S', thereby determining the actual speed S (Step 106). In this manner, the vehicle speed can be determined substantially accurately.

The kinetic energy increases with the increase of the number of the passengers, and at the time of the slip, the deceleration becomes gentle. In view of this, the constant a determined in Step 103 is arranged to decrease with the increase of the number of the passengers, and therefore the actual vehicle speed S can be calculated more accurately.

Then, it is judged whether or not the thus determined vehicle speed S is lower than 10 km/h (Step 107). If it is judged that the vehicle speed S is lower than 10 km/h, the map A is selected (Step 108).

If the judgment in Step 107 is "NO", it is judged whether or not the vehicle speed S is lower than 20 km/h (Step 109). If the judgment in Step 109 is "YES" (that is, 10 km/h$\leq$S<20 km), the map B is selected (Step 110). If the judgment in Step 109 is "NO" (that is, S>20 km/h), the map C is selected (Step 111).

Then, in accordance with the selected map and the deceleration, the trigger threshold level Th is determined (Step 112). Then, it is judged whether or not the integral value $\Delta v$ of the deceleration reaches the trigger threshold level Th (Step 113). If this judgment is "YES", the program jumps to a collision control routine, and the activation instruction signal of a high level is supplied to the transistor 11 through this routine, thereby igniting the squib 1. If the judgment is "NO", the program returns to the main routine.

As described above, when the vehicle speed is high, there is selected the map C in which the trigger threshold level Th is low relative to the deceleration G. When the vehicle speed is high, there is a great possibility that an impact upon collision is large, and in this case by selecting the map C, the air bag can be expanded earlier.

When the vehicle speed is low, there is selected the map B in which the trigger threshold level Th is high relative to the deceleration G. When the vehicle speed is low, there is a possibility that the impact is relatively gentle, and in this case by selecting the map B, an inadvertent activation of the air bag can be positively prevented.

When the vehicle speed is very low, there is selected the map A in which the trigger threshold level Th is high in the region where the deceleration G is large. By doing so, even when a very large deceleration is instantaneously produced, for example, by a hammer blow applied at the time of repair of the vehicle, an inadvertent activation of the air bag can be positively prevented.

As is clear from the above description, Steps 107 to 111 in the routine of FIG. 7 substantially constitute vehicle speed compensation means, and Step 112 constitutes deceleration compensation means, and Step 113 constitutes collision judgment means.

By using a single deceleration-threshold level characteristics map, the trigger threshold level in accordance with the vehicle speed can be selected. In this case, for determining the trigger threshold level, a numerical value determined in accordance with the vehicle speed is added to, or subtracted from, or multiplied by the detected deceleration so as to obtain a corrected deceleration, and by applying this corrected deceleration to the map, the trigger threshold level is determined. The above numerical value is so determined that the corrected deceleration is large with the high vehicle speed, and is small with the low vehicle speed. The above integration of the deceleration may be calculated using the corrected deceleration.

Figure 8:
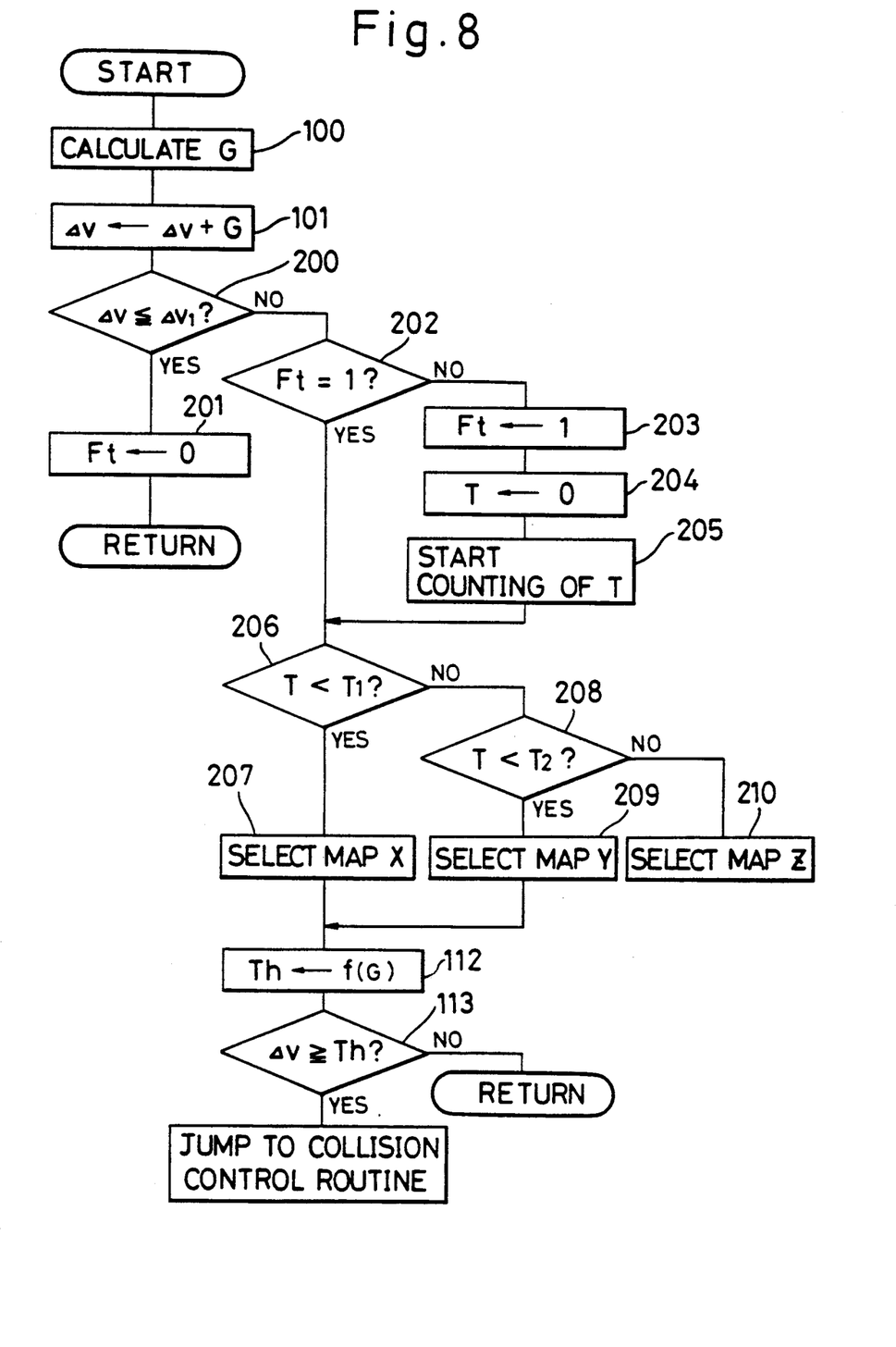
FIG. 8 is a flow chart of a modified timer interrupt routine executed by the microcomputer.
Figure 9:
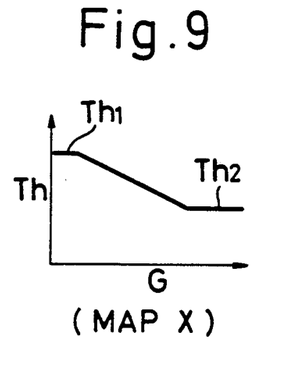
FIGS. 9 to 11 are diagrammatical illustrations respectively showing maps of different deceleration-threshold level characteristics used in the routine of FIG. 8.
Figure 10:
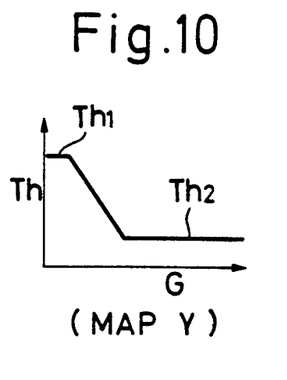
Figure 11:
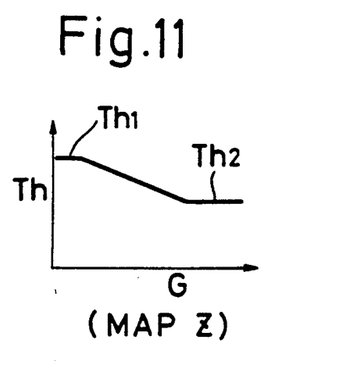

The microcomputer may execute a routine shown in FIG. 8, and may select one of maps X, Y and Z, shown respectively in FIGS. 9 to 11, in accordance with the time of elapse after the collision. The maps X, Y and Z differ from one another on the following points. The lower limit Th2 of the trigger threshold level Th is the highest in the map Z, and is the lowest in the map Y, and is intermediate in the map X. The inclination of the characteristics line in the intermediate region of the deceleration G is gentle in the maps X and Z, and is abrupt in the map Y. Therefore, when the deceleration G is equal, the trigger threshold level Th is lower in the order of the maps Y, X and Z, and the squib ignition is carried out earlier in this order.

The timer interrupt routine of FIG. 8 will now be described in detail. Those Steps of FIG. 8 corresponding respectively to those of FIG. 7 are designated by identical reference numerals, respectively, and explanation thereof will be omitted. After the integration calculation in Step 101, it is judged whether or not the integral value $\Delta v$ exceeds a predetermined level $\Delta v1$ (Step 200). This predetermined level $\Delta v1$ is far lower than the trigger threshold level Th, and is at the same level as the integral value of such a deceleration as produced by a relatively small impact.

If the judgment in Step 200 is "NO", a flag Ft is reset (Step 201), and the program is returned to the main routine. This flag Ft represents the fact that a timer T (time measurement means) later described is measuring the elapse time.

If the judgment in Step 200 is "YES" (that is, it is judged that the integral value $\Delta v$ exceeds the predetermined value $\Delta v1$), preparations for the collision judgment are made. First, it is judged whether or not the flag Ft is set (Step 202). If it is judged that the flag Ft is not set, the flag Ft is set (Step 203), and the timer T is reset (Step 204), and the counting of the timer T is started (Step 205), and the routine proceeds to Step 206. If it is judged in Step 202 that the flag Ft is set, Steps 203 to 205 are skipped, and the routine proceeds to Step 206.

In Step 206, it is judged whether or not the elapse time counted by the timer T is less than a first set time period T1. If it is judged that the elapse time is less than T1, the map X of FIG. 9 is selected (Step 207).

In Step 206, if the elapse time is equal to or more than the first set time period T1, it is judged whether or not the elapse time counted by the timer T is less than a second set time period T2 (Step 208). If this judgment is "YES" (that is, T1$\leq$T (elapse time)<T2), the map Y of FIG. 10 is selected Step 209). If the judgment is "NO" (that is, T$\leq$T2), the map Z of FIG. 11 is selected (Step 210).

Figure 12:
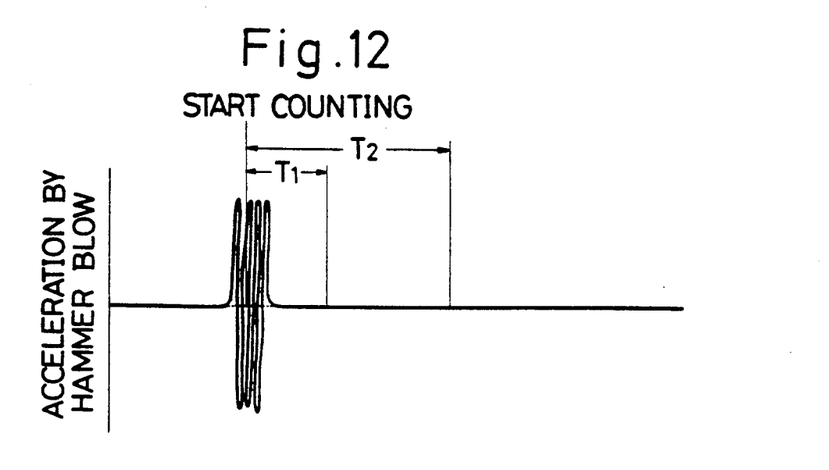
FIG. 12 is a time chart showing the acceleration and deceleration produced when a hammer blow is applied to the vehicle.

Effects for the above map selection will now be described with reference to FIGS. 12 and 13 in which the upper side of a dot-and-dash line represents the deceleration whereas the lower side thereof represents the acceleration. The reason why the map X is selected at the initial stage (T<T1) is to prevent the air bag from being inadvertently activated upon application of a hammer blow shown in FIG. 12. More specifically, although such a hammer blow applies a large deceleration to the vehicle, the time period of application of the hammer blow is instantaneous, and the impact disappears within the time period T1 from the time of start of the time measurement. In this case, by selecting the map X in which the lower limit Th2 of the trigger threshold level is relatively high in the region where the deceleration G is large, the integral value does not reach the trigger threshold level.

Figure 13:
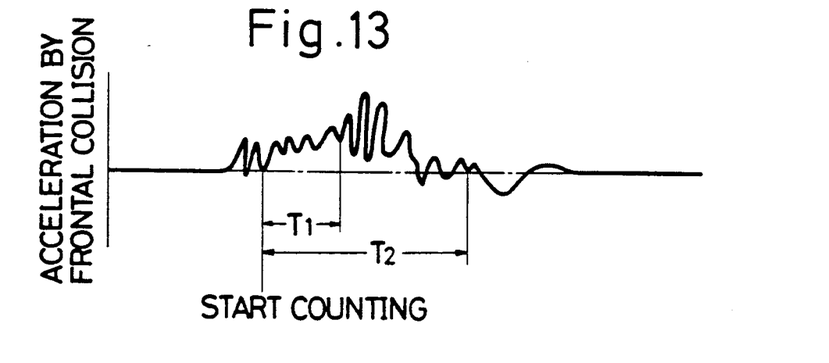
FIG. 13 is a time chart showing the acceleration and deceleration produced when a frontal collision of the vehicle occurs.

The reason why the map Y is selected at the intermediate stage (T1≦T<T2) is that an impact on the vehicle at this stage is not a hammer blow, and that preparations for a rapid expansion of the air bag must be made taking into consideration a heavy collision such as a frontal collision shown in FIG. 13.

Even when the deceleration continues until the final stage (T≧T2), this collision is gentle. However, even when the deceleration is relative small, its integral value increases to a high level by the long-time integration. If an instantaneous impact causing a large deceleration is applied thereafter, for example, by a secondary collision, the trigger threshold level decreases in response to this large deceleration, in which case it is possible that the integral value may exceed the trigger threshold level. Therefore, at this stage, by selecting the map Z to make the trigger threshold level relatively high, an inadvertent activation of the air bag can be prevented positively.

As is clear from the foregoing description, Steps 206 to 210 of the routine of FIG. 8 substantially constitute time compensation means.

Figure 14:
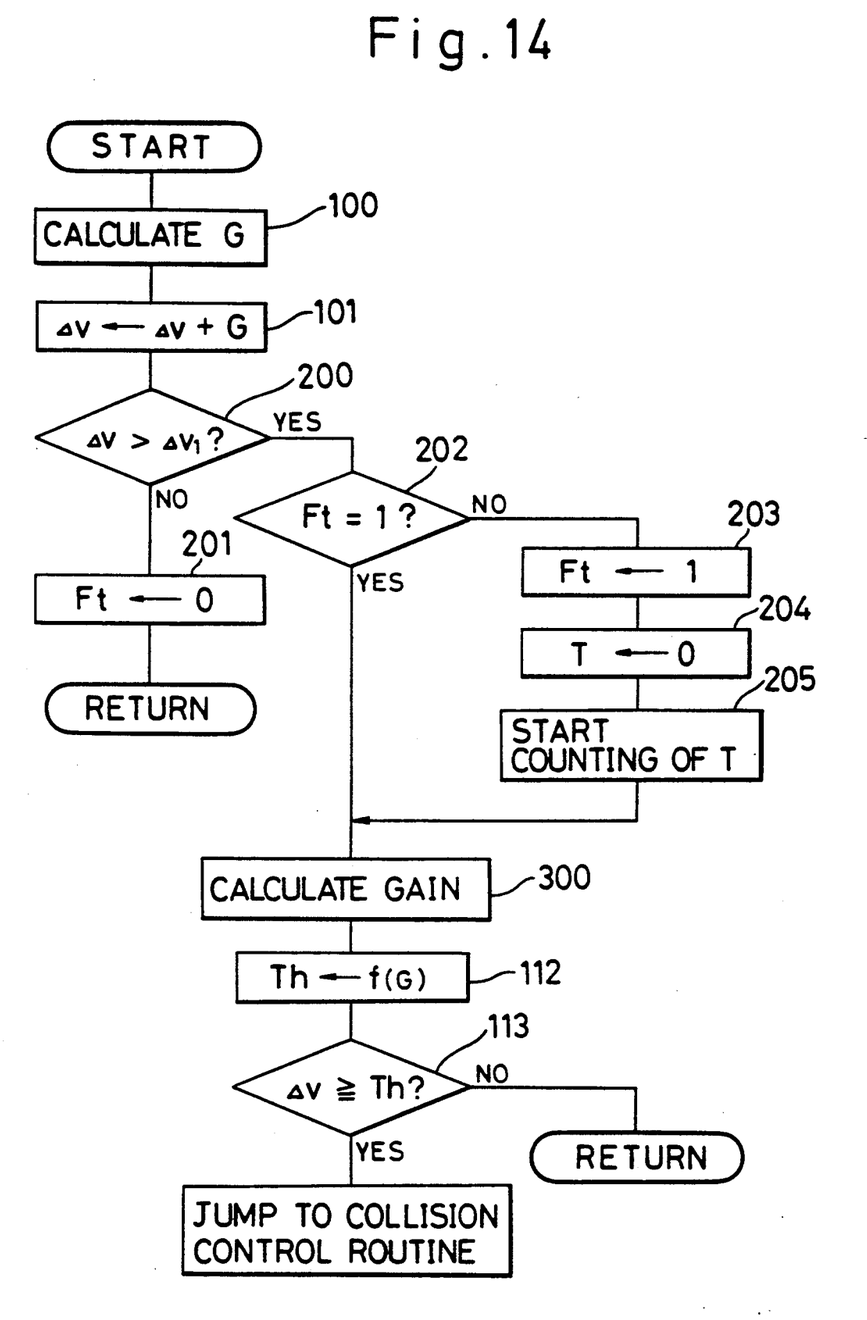
FIG. 14 is a flow chart of another modified timer interrupt routine executed by the microcomputer.
Figure 15:
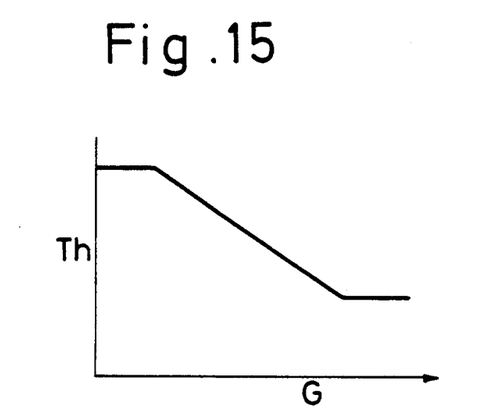
FIG. 15 is a diagrammatical illustration showing a map of deceleration-threshold level characteristics used in the routine of FIG. 14.
Figure 16:
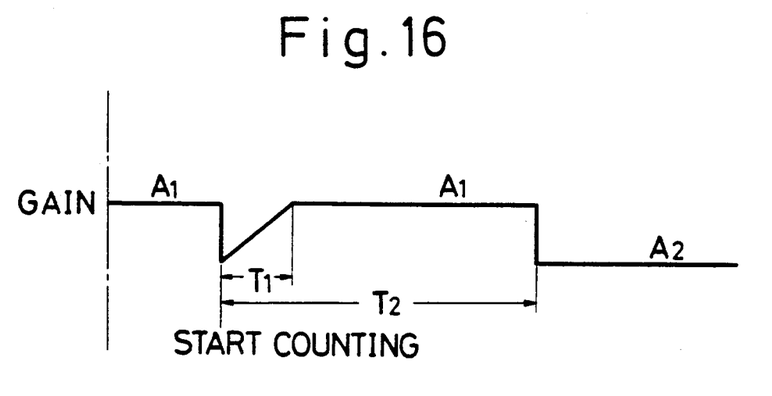
FIG. 16 is a diagrammatical illustration showing the relation between an elapse time and a gain for the deceleration, used in the routine of FIG. 14.

FIGS. 14 to 16 show a further modified embodiment. In this embodiment, there is used a single deceleration-threshold level characteristics map shown in FIG. 15. A microcomputer executes a timer interrupt routine of FIG. 14. Those Steps of FIG. 14 corresponding respectively to those of the routine of FIG. 8 are designated respectively by identical reference numerals, and detailed explanation thereof will be omitted. In the routine of FIG. 14, a map selection is not made, and instead in Step 300, a gain by which the deceleration is to be multiplied is calculated in accordance with an elapse time T. More specifically, as shown in FIG. 16, the gain has a relatively high value A1 before starting the measurement of the elapse time. The gain is decreased to a small value A2 at the time of starting the measurement of the elapse time, and the gain is gradually increased with the lapse of the time, and is returned to the value A1 after the lapse of a time period T1. When the elapse time is more than T2, the gain is again decreased to the value A2.

When the gain is high, the deceleration G to be calculated in Step 100 of a subsequent routine is greater than the actual deceleration G. Therefore, the deceleration G applied to the map of FIG. 15 is large, and the trigger threshold level is determined to be lower, as compared with the case where the actual deceleration is applied to the map. In addition, since the above deceleration G becomes greater, the integral value calculated in Step 101 is increased earlier. This also contributes to the decrease of the trigger threshold level relative to the integral value. In such case, the air bag is activated earlier. In contrast, when the gain is low, the opposite situation is encountered.

The reason why the gain is kept at the high value A1 before starting the measurement of the elapse time is to cause the integral value Δv to reach the above predetermined level Δv1 early, thereby starting the measurement of the elapse time early.

The reason why the gain is decreased to A2 at the time of start of the measurement of the elapse time is to deal with the hammer blow. The reason why the gain is thereafter increased again to A1 is to make preparations for a rapid expansion of the air bag, taking a heavy collision into consideration. The reason why the gain is again decreased to A2 when the elapse time becomes T2 is to more positively prevent an inadvertent expansion of the air bag at the time of a gentle collision.

As is clear from the above description, Step 300 of the routine of FIG. 14 constitutes time compensation means. The actual deceleration may be calculated in Step 100, and the calculation of the integration may be made based on the actual deceleration in Step 101. In this case, for determining the trigger threshold level in Step 112, a corrected deceleration is obtained by multiplying the actual deceleration, calculated in Step 100, by the above gain and this corrected deceleration is offered as the deceleration to be applied to the map.

The present invention is not to be restricted to the above embodiments, and various modifications can be made. For example, in the microcomputer, the threshold level in accordance with the deceleration may be calculated, using formulas instead of the maps.

A numerical value in accordance with the deceleration may be added to, or subtracted from, or multiplied by the integral value of the deceleration so as to obtain a corrected integral value, and then this corrected integral value may be compared with a predetermined trigger threshold level. For example, when the corrected integral value is to be obtained by multiplying the integral value by such a numerical value, the numerical value is large when the deceleration is large, and the numerical value is small when the deceleration is small. Also, the corrected integral value to be compared with the trigger threshold level may be obtained by adding a numerical value, determined in accordance with the vehicle speed or the elapse time, to the integral value of the deceleration, or by subtracting such a numerical value from the integral value, or by multiplying the integral value by such a numerical value.

Strictly speaking, the value of the trigger threshold level means its absolute level. For example, when the deceleration has a negative value, the trigger threshold level also has a negative value, and shifts toward zero as the deceleration increases.

The trigger threshold level may be varied in a stepping manner in accordance with the deceleration. To give an extreme example, the threshold level may be varied in two steps.

The control system of the present invention can be applied not only to the air bag, but also to a device for tightening a seat belt.

What is claimed is:

1. A control system for a vehicle safety device comprising:
    (a) acceleration detecting means for detecting deceleration of a vehicle;
    (b) integrating means for integrating the deceleration from said acceleration detecting means;
    (c) collision judgment means for comparing an integral value, obtained by said integrating means, with a trigger threshold level to judge whether or not a collision has occurred, and for outputting an activation instruction signal when said collision judgment means judges that the collision has occurred;
    (d) a drive circuit responsive to said activation instruction signal from said collision judgment means for activating said vehicle safety device; and (e) deceleration compensation means for adjusting said trigger threshold level in accordance with the deceleration in such a manner that said trigger threshold level becomes lower when the deceleration is large and that said trigger threshold level becomes higher when the deceleration is small.

2. A control system according to claim 1, further comprising:
vehicle speed detecting means for detecting the speed of the vehicle, and
vehicle speed compensation means for varying the relation between said threshold level and the deceleration in accordance with a vehicle speed, detected by said vehicle speed detecting means, in such a manner that said threshold level becomes low when the vehicle speed is high and that said threshold level becomes high when the vehicle speed is low.

3. A control system according to claim 1, further comprising:
time measurement means for starting the measurement of an elapse time when said integral value reaches a predetermined level lower than said threshold level, and
time compensation means for varying the relation between said threshold level and the deceleration in accordance with said elapse time.

4. A control system for a vehicle safety device comprising:
(a) acceleration detecting means for detecting deceleration of a vehicle;
(b) integrating means for integrating the deceleration from said acceleration detecting means;
(c) collision judgment means for comparing an integral value, obtained by said integrating means, with a trigger threshold level to judge whether or not a collision has occurred, and for outputting an activation instruction signal when said collision judgment means judges that the collision has occurred;
(d) a drive circuit responsive to said activation instruction signal from said collision judgment means for activating said vehicle safety device;
(e) deceleration compensation means for adjusting said trigger threshold level in accordance with the deceleration in such a manner that said trigger threshold level becomes lower when the deceleration is large and that said trigger threshold level becomes higher when the deceleration is small; and wherein
said control system is of the analog type,
said collision judgment means having two input terminals one of which receives an integral voltage, representative of the integral value of the deceleration, from said integrating means,
said deceleration compensation means including
a divider circuit having two resistor means serially connected together, one terminal of said divider circuit being connected to a constant voltage source whereas the other terminal thereof is connected to an output terminal of said acceleration detecting means, and
a voltage at a junction point between said two resistor means of said divider circuit being supplied, as a threshold voltage representative of said trigger threshold level, to the other input terminal of said collision judgment means, and
whereby said threshold voltage is linearly varied with respect to the output of said acceleration detecting means representative of the deceleration.

5. A control system according to claim 4, in which,
said acceleration detecting means outputs a reference voltage of a positive value when the vehicle is stopped or is running at a constant speed,
said acceleration detecting means outputting a voltage lower than said reference voltage when said vehicle is decelerated, said reference voltage being lower than a constant voltage fed from said constant voltage source, and
said integrating means inverting and integrating the output of said acceleration detecting means.

6. A control system according to claim 5, in which,
the output voltage of said acceleration detecting means is substantially zero volts when the deceleration is above a predetermined value, so that said threshold voltage is kept at a positive constant value.

7. A control system for a vehicle safety device comprising:
(a) acceleration detecting means for detecting deceleration of a vehicle;
(b) integrating means for integrating the deceleration from said acceleration detecting means;
(c) collision judgment means for comparing an integral value, obtained by said integrating means, with a trigger threshold level to judge whether or not a collision has occurred, and for outputting an activation instruction signal when said collision judgment means judges that the collision has occurred;
(d) a drive circuit responsive to said activation instruction signal from said collision judgment means for activating said vehicle safety device;
(e) deceleration compensation means for adjusting said trigger threshold level in accordance with the deceleration in such a manner that said trigger threshold level becomes lower when the deceleration is large and that said trigger threshold level becomes higher when the deceleration is small;
(f) vehicle speed detecting means for detecting the speed of the vehicle;
(g) vehicle speed compensation means for varying the relation between said trigger threshold level and the deceleration in accordance with a vehicle speed, detected by said vehicle speed detecting means, in such a manner that said trigger threshold level becomes lower when the vehicle speed is high and that said trigger threshold level becomes higher when the vehicle speed is low; and
(h) a microcomputer, said microcomputer including
said integrating means,
said collision judgment means,
said deceleration compensation means, and
said vehicle speed compensation means,
(g) a plurality of maps representative of the relation between the deceleration and said trigger threshold level being stored in said microcomputer, said plurality of maps including at least
a first map, and
a second map;
in each of said maps, said trigger threshold level being substantially linearly varied with respect to the deceleration in a first deceleration range in which the deceleration is below a specific value, said trigger threshold level being constant and its lower limit in a second deceleration range in which the deceleration is above said specific value, the variation of said trigger threshold level with respect to the deceleration in said first deceleration range being gentler in said first map than in said second map, the lower limit of said trigger threshold level being higher in said first map than in said second map, and said microcomputer selecting said first map when the vehicle speed is low, and selecting said second map when the vehicle speed is high.

8. A control system according to claim 7, in which, said microcomputer further includes tire lock detecting means; when a tire lock is detected by said tire lock detecting means, said microcomputer calculating the actual vehicle speed by gradually decreasing the vehicle speed, detected by said vehicle speed detecting means immediately before the detection of the tire lock, in accordance with an elapse time, and said microcomputer selecting one of said maps in accordance with said calculated vehicle speed.

9. A control system according to claim 8, in which said tire lock is detected base on an abrupt decrease of the detected vehicle speed.

10. A control system for a vehicle safety device comprising:
    (a) acceleration detecting means for detecting deceleration of a vehicle;
    (b) integrating means for integrating the deceleration from said acceleration detecting means;
    (c) collision judgment means for comparing an integral value, obtained by said integrating means, with a trigger threshold level to judge whether or not a collision has occurred, and for outputting an activation instruction signal when said collision judgment means judges that the collision has occurred;
    (d) a drive circuit responsive to said activation instruction signal from said collision judgment means for activating said vehicle safety device;
    (e) deceleration compensation means for adjusting said trigger threshold level in accordance with the deceleration in such a manner that said trigger threshold level becomes lower when the deceleration is large and that said trigger threshold level becomes higher when the deceleration is small;
    (f) time measurement means for starting the measurement of an elapse time when said integral value reaches a predetermined level lower than said trigger threshold level;
    (g) time compensation means for varying the relation between said trigger threshold level and the deceleration in accordance with said elapse time; and wherein
    the relation between said trigger threshold level and the deceleration is varied in such a manner that said trigger threshold level is high when said elapse time is in a first time period, and that said trigger threshold level is low when said elapse time is in a second time period subsequent to said first time period, and that said trigger threshold level is high when said elapse time is in a third time period subsequent to said second time period.

11. A control system according to claim 10, in which there is provided:
    a microcomputer, said microcomputer substantially including
    said integrating means,
    said collision judgment means,
    said deceleration compensation means,
    said time measurement means and said time compensation means,
    a plurality of maps representative of the relation between the deceleration and said trigger threshold level being stored in said microcomputer, said plurality of maps including
    a first map,
    a second map and
    a third map;
    in each of said maps, said trigger threshold level being substantially linearly varied with respect to the deceleration in a first deceleration region in which the deceleration is below a specific value, said trigger threshold level being constant and its lower limit in a second deceleration region in which the deceleration is above said specific value, the variation of said trigger threshold level with respect to the deceleration in said first deceleration region being more abrupt in said second map than in said first and third maps, the lower limit of said trigger threshold level being lower in said second map than in said first and third maps, and said microcomputer selecting said first map when the measured time is in said first time period, and selecting said second map when the measured time is in said second time period, and selecting said third map when the measured time is in said third time period.

12. A control system according to claim 10, in which there is provided
    a microcomputer, said microcomputer including
    said integrating means,
    said collision judgment means,
    said deceleration compensation means,
    said time measurement means, and
    said time compensation means,
    a map representative of the relation between the deceleration and said trigger threshold level being stored in said microcomputer, said microcomputer calculating a value by multiplying the deceleration by a gain, and applying this value as the deceleration to said map, thereby determining said trigger threshold level, said gain varying in accordance with the measured time; and when said measured time is in said first time period, said gain being small, and when said measured time is in said second time period, said gain being large, and when said measured time is in said third time period, said gain is small.

* * * * *